(12) United States Patent
Chang et al.

(10) Patent No.: US 11,502,601 B2
(45) Date of Patent: Nov. 15, 2022

(54) CONTROL CIRCUIT AND CONTROL METHOD OF POWER CONVERTER

(71) Applicant: uPI semiconductor corp., Zhubei (TW)

(72) Inventors: Chih-Lien Chang, Zhubei (TW); Chun-Chieh Wang, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 0 days.

(21) Appl. No.: 17/341,437

(22) Filed: Jun. 8, 2021

(65) Prior Publication Data
US 2021/0399635 A1  Dec. 23, 2021

(30) Foreign Application Priority Data

Jun. 18, 2020 (CN) .......................... 202010558675.3

(51) Int. Cl.
*H02M 3/156* (2006.01)
*H02M 1/14* (2006.01)
*H02M 1/08* (2006.01)

(52) U.S. Cl.
CPC ............. *H02M 3/156* (2013.01); *H02M 1/08* (2013.01); *H02M 1/14* (2013.01)

(58) Field of Classification Search
None
See application file for complete search history.

(56) References Cited

U.S. PATENT DOCUMENTS

| | | | |
|---|---|---|---|
| 6,791,306 B2 * | 9/2004 | Walters | H02M 3/156 323/288 |
| 7,482,791 B2 | 1/2009 | Stoichita et al. | |
| 7,482,793 B2 | 1/2009 | Stoichita | |
| 8,446,135 B2 * | 5/2013 | Chen | H02M 3/156 323/288 |
| 8,766,615 B2 * | 7/2014 | Nishida | H02M 3/156 323/283 |
| 9,030,177 B2 * | 5/2015 | Nakashima | H02M 3/1588 323/285 |
| 9,065,337 B2 | 6/2015 | Tanabe | |
| 9,201,438 B2 * | 12/2015 | MacLean | H02M 3/1588 |
| 9,214,866 B2 | 12/2015 | Nora | |
| 9,306,454 B2 | 4/2016 | Jayaraj et al. | |
| 9,588,532 B2 | 3/2017 | Rahimi et al. | |
| 9,729,058 B2 | 8/2017 | Larosa et al. | |
| 10,218,274 B1 | 2/2019 | Chan | |

\* cited by examiner

*Primary Examiner* — Jeffrey A Gblende
(74) *Attorney, Agent, or Firm* — McClure, Qualey & Rodack, LLP

(57) ABSTRACT

A control circuit of a power converter is coupled to an output stage and controls it to convert an input voltage into an output voltage and generate an output current. The control circuit includes a ripple generation circuit, a synthesis circuit, an error amplifier, a comparator and a PWM circuit. The ripple generation circuit generates a ripple signal according to an input voltage, an output voltage and output current. The synthesis circuit receives the ripple signal and a first feedback signal related to output voltage to provide a second feedback signal. The error amplifier receives the second feedback signal and a reference voltage to generate an error signal. The comparator receives a ramp signal and error signal to generate a comparison signal. The PWM circuit generates a PWM signal to control output stage according to the comparison signal. A slope of ripple signal is changed with the output current.

19 Claims, 7 Drawing Sheets

CONTROL CIRCUIT AND CONTROL METHOD OF POWER CONVERTER

BACKGROUND OF THE INVENTION

1. Field of the Invention

The invention relates to power conversion; in particular, to a control circuit and a control method of a power converter.

2. Description of the Prior Art

In a current pulse width modulation (PWM) power converter, if a low equivalent series resistance (ESR) capacitor is used as an output capacitor, ripple injection technology should be also used to achieve feedback control.

However, the current ripple injection technology can only perform feedback control through an offset of a feedback voltage. This method will generate an offset in a ripple signal, so that errors will occur during an on-time of a PWM signal generated according to the ripple signal, causing the output voltage of the power converter to drop as the load increases.

In addition, because the external ripple injection circuit usually needs to include additional passive components, the circuit cost is increased, and the internal ripple injection circuit usually needs to use a differential circuit or an integrator circuit with a large capacitance, resulting in an excessive circuit area.

Moreover, whether it is an internal or external ripple injection circuit, if only a virtual ripple signal waveform is generated and injected into the feedback path, once the load is changed, the on-time generated according to the virtual ripple signal waveform does not meet the actual requirements, resulting in an offset of the output voltage. The above-mentioned problems still need to be further resolved.

SUMMARY OF THE INVENTION

Therefore, the invention provides a control circuit and a control method of a power converter to solve the above-mentioned problems in the prior art.

An embodiment of the invention is a control circuit of a power converter. In this embodiment, the control circuit is coupled to an output stage and configured to control the output stage to convert an input voltage into an output voltage and generate an output current. The control circuit includes a ripple generation circuit, a synthesis circuit, an error amplifier, a comparator and a pulse width modulation (PWM) circuit. The ripple generation circuit is configured to generate a ripple signal according to the input voltage, the output voltage and the output current. The synthesis circuit is coupled to the ripple generation circuit and configured to receive the ripple signal and a first feedback signal to provide a second feedback signal, wherein the first feedback signal is related to the output voltage. The error amplifier is configured to receive the second feedback signal and a reference voltage to generate an error signal. The comparator is configured to receive a ramp signal and the error signal to generate a comparison signal. The PWM circuit is coupled to the comparator and the output stage and configured to generate a PWM signal according to the comparison signal to control the output stage. A slope of the ripple signal changes with the output current.

In an embodiment of the invention, the ripple signal includes a rising part and a falling part, and a slope of the falling part changes with the output current.

In an embodiment of the invention, when the output current is larger, the slope of the falling part is larger.

In an embodiment of the invention, the ripple generation circuit includes a first current source and a second current source. The first current source is configured to generate the rising part according to the input voltage and the output voltage. The second current source is configured to generate the falling part according to the output voltage and the output current.

In an embodiment of the invention, the ripple generation circuit includes a capacitor and a switch. The switch is coupled among the first current source, the second current source and the capacitor and configured to selectively switch the first current source to charge the capacitor or the second current source to discharge the capacitor controlled by the PWM signal.

In an embodiment of the invention, the ripple generation circuit generates a current signal according to a sensing signal to adjust the slope of the falling part.

In an embodiment of the invention, the control circuit includes a sensing circuit. The sensing circuit is coupled to the output stage and the ripple generation circuit respectively and configured to sense the output current from the output stage and provide the sensing signal to the ripple generation circuit.

In an embodiment of the invention, the adjusted falling part equals to the falling part before adjustment plus a current signal, and the current signal is K times the sensing signal and K is a magnification.

In an embodiment of the invention, the ripple generation circuit generates a voltage signal according to a sensing signal to adjust the slope of the falling part.

In an embodiment of the invention, the voltage signal equals to the output voltage plus K times the sensing signal multiplied by a resistance value and K is a magnification.

In an embodiment of the invention, the output stage is coupled to a load and the sensing signal is a load current flowing through the load.

Another embodiment of the invention is a control method of a power converter. The power converter is coupled to an output stage and controlling the output stage to convert an input voltage into an output voltage and generate an output current. The control method includes steps of: (a) generating a ripple signal according to the input voltage, the output voltage and the output current; (b) receiving the ripple signal and a first feedback signal to provide a second feedback signal, wherein the first feedback signal is related to the output voltage; (c) generating an error signal according to the second feedback signal and a reference voltage; (d) generating a comparison signal according to a ramp signal and the error signal; and (e) generating a PWM signal according to the comparison signal to control the output stage, wherein a slope of the ripple signal changes with the output current.

In an embodiment of the invention, the ripple signal includes a rising part and a falling part, and a slope of the falling part changes with the output current.

In an embodiment of the invention, when the output current is larger, the slope of the falling part is larger.

In an embodiment of the invention, the step (a) further includes: (a1) generating the rising part according to the input voltage and the output voltage; and (a2) generating the falling part according to the output voltage and the output current.

In an embodiment of the invention, the step (a) further includes: selectively outputting the rising part and the falling part as the ripple signal according to the PWM signal.

In an embodiment of the invention, the adjusted falling part equals to the falling part before adjustment plus a current signal, and the current signal is K times a sensing signal of the output current and K is a magnification.

In an embodiment of the invention, the control method further includes: sensing the output current and providing a sensing signal; and generating a voltage signal according to the sensing signal and the output voltage to adjust the slope of the falling part.

In an embodiment of the invention, the voltage signal equals to the output voltage plus K times the sensing signal multiplied by a resistance value and K is a magnification.

Compared to the prior art, the control circuit and the control method of the power converter of the invention have the following advantages/effects:

(1) there is no need to dispose passive components of the ripple injection circuit externally, so the number of components can be effectively reduced;

(2) since a circuit with a large capacitance (such as an integrator/differential circuit, etc.) does not need to be disposed in the internal ripple injection circuit, the circuit area can be effectively reduced; and (3) when the load increases, the drop of the output voltage can be effectively reduced or even eliminated to achieve a stable output.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
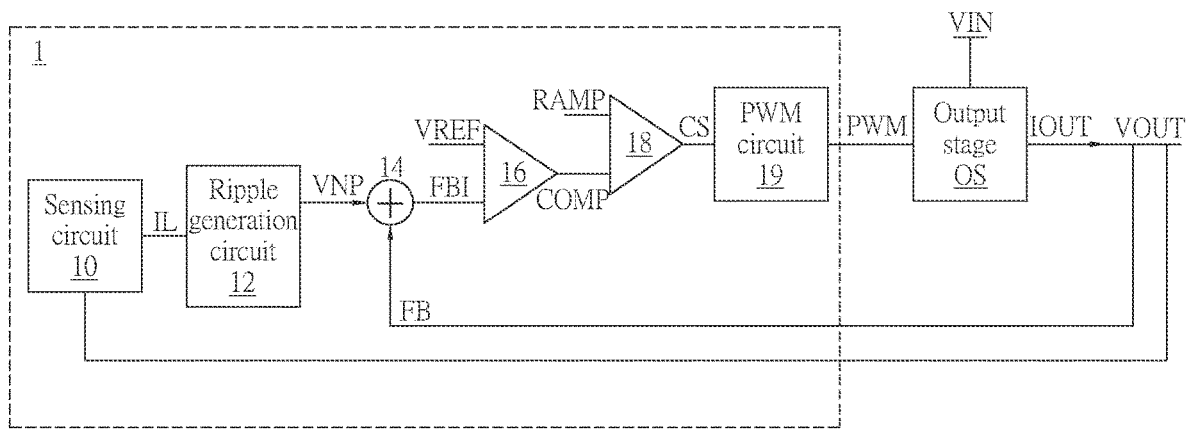
FIG. 1 is a schematic diagram of a control circuit 1 of a power converter in an embodiment of the invention.

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

An embodiment according to the invention is a control circuit of a power converter. In this embodiment, the control circuit is coupled to an output stage of the power converter and configured to control an operation of the output stage to generate an output current.

Please refer to FIG. 1. FIG. 1 is a schematic diagram of the control circuit 1 of the power converter.

As shown in FIG. 1, the control circuit 1 is coupled to the output stage OS of the power converter and configured to control the output stage OS to convert an input voltage VIN into an output voltage VOUT and generate an output current IOUT. The control circuit 1 includes a ripple generation circuit 12, a synthesis circuit 14, an error amplifier 16, a comparator 18 and a PWM circuit 19.

The ripple generation circuit 12 is coupled to the synthesis circuit 14. The synthesis circuit 14 is coupled to the output stage OS, the ripple generation circuit 12 and the error amplifier 16 respectively. Two input terminals of the error amplifier 16 are coupled to a reference voltage VREF and the synthesis circuit 14 respectively. Two input terminals of the comparator 18 are coupled to the ramp signal RAMP and the output terminal of the error amplifier 16 respectively. The PWM circuit 19 is coupled to the output terminal of the comparator 18 and the output stage OS respectively. The output stage OS is coupled to the input voltage VIN of the power converter, the PWM circuit 19 and the synthesis circuit 14 respectively. In practical applications, the control circuit 1 further includes a sensing circuit 10 coupled to the output stage OS and the ripple generation circuit 12, but not limited to this.

The sensing circuit 10 is used to sense the output current IOUT of the output stage OS and accordingly provide the sensing signal IL to the ripple generation circuit 12, but not limited to this. The sensing signal IL provided by the sensing circuit 10 is related to the output current TOUT of the power converter.

The ripple generation circuit 12 is used to generate a ripple signal VNP to the synthesis circuit 14 according to the input voltage VIN, the output voltage VOUT of the power converter, and the sensing signal IL related to the output current TOUT of the power converter. The slope of the ripple signal VNP will change with the output current TOUT.

In detail, the ripple signal VNP generated by the ripple generation circuit 12 includes a rising part IU and a falling part ID, and the slope of the falling part ID changes with the output current IOUT. For example, when the output current IOUT is larger, the slope of the falling part ID will be larger, and vice versa.

The synthesis circuit 14 is used to receive the ripple signal VNP generated by the ripple generation circuit 12 and a first feedback signal FB from the output stage OS, and accordingly provide a second feedback signal FBI to the error amplifier 16. In practical applications, the first feedback signal FB is related to the output voltage VOUT of the power converter, and the synthesis circuit 14 may be an adder for adding the ripple signal VNP and the first feedback signal FB to obtain the second feedback signal FBI, but not limited to this.

The two receiving terminals of the error amplifier 16 receive the reference voltage VREF and the second feedback signal FBI provided by the synthesis circuit 14 respectively, and accordingly generate an error signal COMP to the comparator 18. The two receiving terminals of the comparator 18 receive the ramp signal RAMP and the error signal COMP provided by the error amplifier 16 respectively, and accordingly generate a comparison signal CS to the PWM circuit 19. The PWM circuit 19 generates a PWM signal PWM to the output stage OS according to the comparison signal CS to control the operation of the output stage OS.

Figure 2:
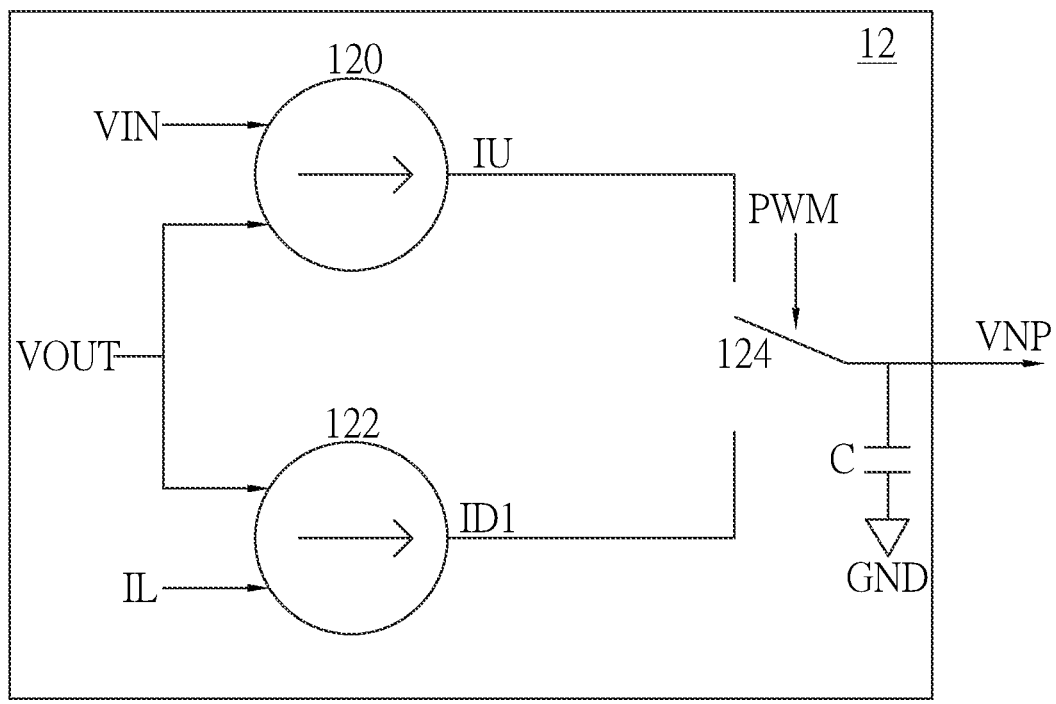
FIG. 2 is an embodiment of the ripple generation circuit 12.

In an embodiment, as shown in FIG. 2, the ripple generation circuit 12 includes a first current source 120, a second current source 122, a switch 124 and a capacitor C. The switch 124 is coupled among the first current source 120, the second current source 122 and the capacitor C.

The first current source 120 generates a rising part IU according to the input voltage VIN and the output voltage VOUT of the power converter. The second current source 122 generates a falling part ID according to the output voltage VOUT of the power converter and the sensing signal IL.

The switch 124 is controlled by the PWM signal PWM to be selectively coupled to the first current source 120 or the second current source 122, so as to alternately switch the first current source 120 to charge the capacitor C or the second current source 122 to discharge the capacitor C to output the ripple signal VNP including the rising part IU and the falling part ID.

Figure 3:
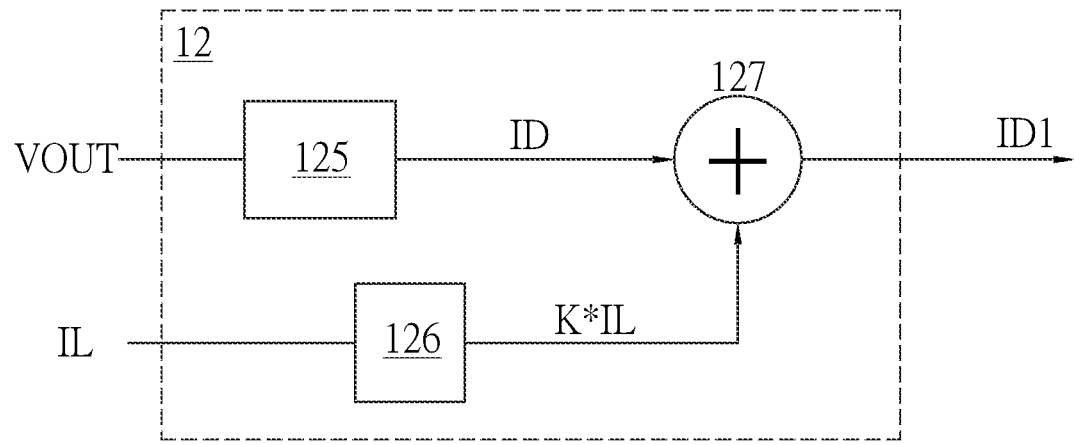
FIG. 3 and FIG. 4 are different embodiments of the ripple generation circuit 12 generating the adjusted falling part ID1 according to the output voltage VOUT and the sensing signal IL respectively.

In another embodiment, as shown in FIG. 3, the ripple generation circuit 12 can amplify the sensing signal IL provided by the sensing circuit 10 by K times into the current signal K*IL, and adjust the slope of the falling part ID with the current signal K*IL, so that the adjusted falling part ID1 equals to the falling part ID before adjustment plus the current signal K*IL, that is, ID1=ID+K*IL, where K is a magnification.

Therefore, when the sensing signal IL increases, the adjusted falling part ID1 will also increase (that is, the slope becomes larger) to prevent the output voltage VOUT of the power converter from offset.

For example, the ripple generation circuit 12 in FIG. 3 can include a voltage-current converter 125, an amplifier 126 and an adder 127. The voltage-current converter 125 and the amplifier 126 are both coupled to the adder 127. The voltage-current converter 125 converts the output voltage VOUT of the power converter into the falling part ID before adjustment and outputs it to the adder 127. The amplifier 126 amplifies the sensing signal IL related to the output current IOUT by K times into the current signal K*IL through the sensing circuit 10 and outputs it to the adder 127. When the adder 127 receives the falling part ID before adjustment and the current signal K*IL, the adder 127 will add the two to generate the adjusted falling part ID1. The output of this circuit is relatively stable and the circuit is relatively simple.

Figure 4:
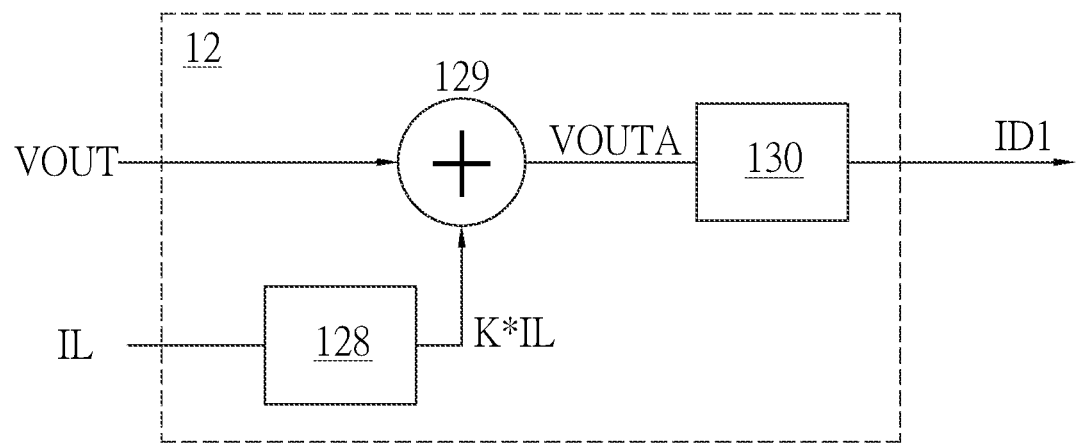

In another embodiment, as shown in FIG. 4, the ripple generation circuit 12 also generates a voltage signal VOUTA according to the sensing signal IL and the output voltage VOUT, so that the voltage signal VOUTA equals to the output voltage VOUT plus K times the sensing signal IL multiplied by the resistance value R, that is, VOUTA=VOUT+K*IL*R, and the slope of the falling part ID is adjusted by the voltage signal VOUTA, and K is a magnification. This circuit control is simpler and has high noise tolerance.

Therefore, when the pumping load increases, the current signal K*IL increases so that the voltage signal VOUTA also increases, and the adjusted falling part ID1 also increases, so as to prevent the output voltage VOUT of the power converter from offset.

For example, the ripple generation circuit 12 in FIG. 4 can include an amplifier 128, an adder 129 and a voltage-current converter 130. The amplifier 128 is coupled to the adder 129. The adder 129 is coupled to the voltage-current converter 130. The amplifier 128 amplifies the sensing signal IL provided by the sensing circuit 10 by K times into the current signal K*IL and outputs it to the adder 129.

When the adder 129 receives the output voltage VOUT of the power converter and the current signal K*IL, the adder 129 adds the two to generate the voltage signal VOUTA to the voltage-current converter 130. The voltage-current converter 130 converts the voltage signal VOUTA into the adjusted falling part ID1 and then outputs it.

Figure 5:
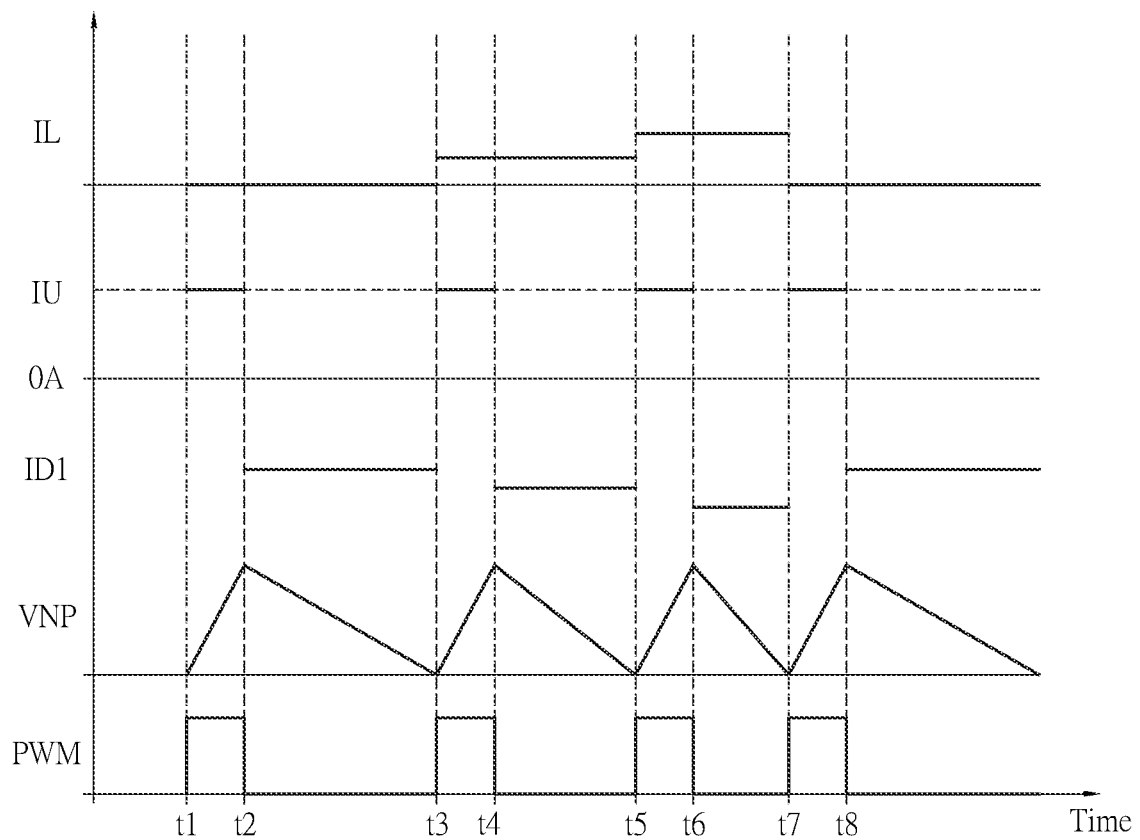
FIG. 5 is a waveform timing diagram of the sensing signal IL, the adjusted falling part ID1, the rising part IU, the ripple signal VNP and the PWM signal PWM under different load states.

Please refer to FIG. 5. FIG. 5 is a waveform timing diagram of the sensing signal IL, the adjusted falling part ID1, the rising part IU, the ripple signal VNP and the PWM signal PWM under different load states.

As shown in FIG. 5, during the period from the time t1 to the time t3, the load state of the system is light load, and the sensing signal IL related to the output current TOUT is low, so that the adjusted falling part ID1 value is small (closer to 0 A), thus the falling slope of the ripple signal VNP is also gentler.

During the period from the time t3 to the time t5, the load state of the system is medium load, and the value of the sensing signal IL becomes larger, so that the adjusted falling part ID1 increases, thus the falling slope of the ripple signal VNP increases.

During the period from the time t5 to the time t7, the load state of the system is heavy, and the slope value of the sensing signal IL becomes larger, so that the adjusted falling part ID1 increases again, and the falling slope of the ripple signal VNP becomes Steeper.

After the time t7, the load state of the system returns to light load, and the value of the sensing signal IL drops back to the original value, so that the adjusted falling part ID1 is reduced, and the falling slope of the ripple signal VNP also becomes gentler.

Figure 6:
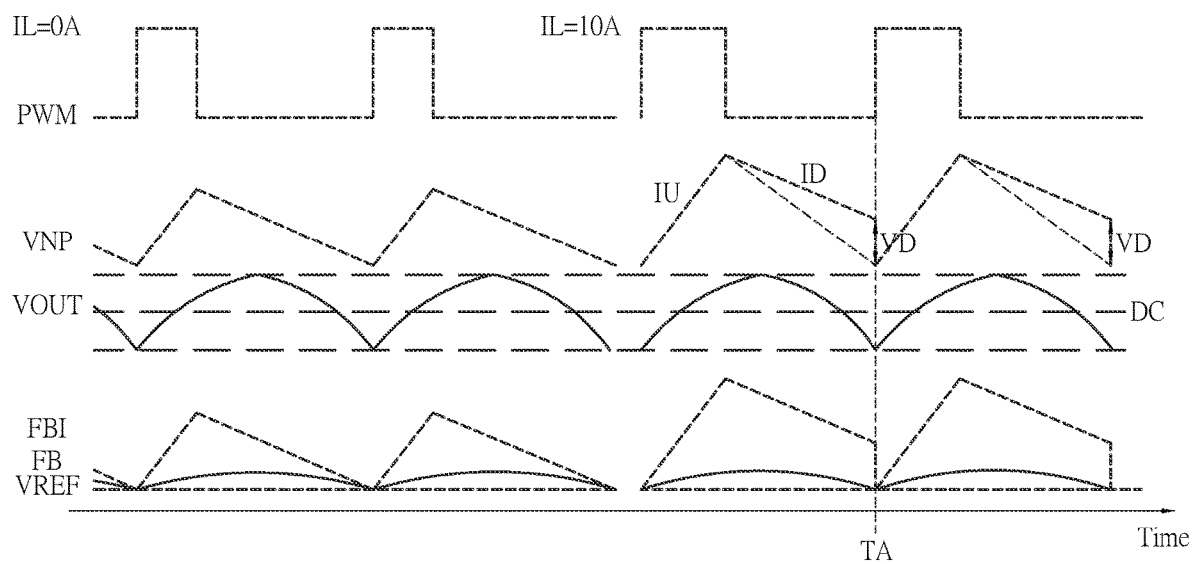
FIG. 6 is a waveform timing diagram in which the slope of the ripple signal VNP of the current power converter remains unchanged at light load (IL=0 A) or heavy load (IL=10 A).

Please refer to FIG. 6. FIG. 6 is a waveform timing diagram in which the slope of the ripple signal of the current power converter remains unchanged at light load or heavy load.

It should be noted that the left half of FIG. 6 is the waveform timing diagram of each signal when the system is under light load (the sensing signal IL=0 A), and the right half of FIG. 6 is the waveform timing diagram of each signal when the system heavy load (the sensing signal IL=10 A).

Under the fixed frequency buck power converter architecture, the direct current (DC) voltage value of the output voltage VOUT will drop during the load consuming period (for example, from 1.8V to 1.79V). The reasons are as follows: when the current value of the sensing signal IL related to the output current IOUT increases (for example, from 0 A to 10 A), the on-time of the PWM signal PWM increases due to the fixed frequency control, resulting in the increasing of the peak voltage reached by the rising part IU of the ripple signal VNP, and consequently the peak voltage reached by the second feedback signal FBI obtained by adding the ripple signal VNP to the first feedback signal FB also increases.

Since the peak voltage reached by the rising part IU of the ripple signal VNP increases during heavy load, the slope of the falling part ID of the ripple signal VNP remains the same as that at light load; therefore, it is too late for the falling part ID of the ripple signal VNP to drop to the lowest voltage value at the time TA (that is, when the PWM signal PWM changes from low level to high level), and a ripple offset VD is generated.

Because when the first feedback signal FB intersects with the reference voltage VREF, the PWM signal PWM will change from low level to high level. Therefore, it is necessary to satisfy the condition that the reference voltage VREF is equal to the ripple offset VD plus the first feedback signal FB. Since the ripple offset VD will increase with the increasing of load consuming, the first feedback signal FB will relatively decrease with the increase of load consuming, which causes the output of the power converter to become unstable.

In other words, the load consuming behavior causes the end point of the ripple signal VNP (or the second feedback signal FBI) to rise, which is equivalent to the rise of the reference voltage VREF, thus causing the direct current (DC) voltage value of the output voltage VOUT of the power converter to fall.

Figure 7:
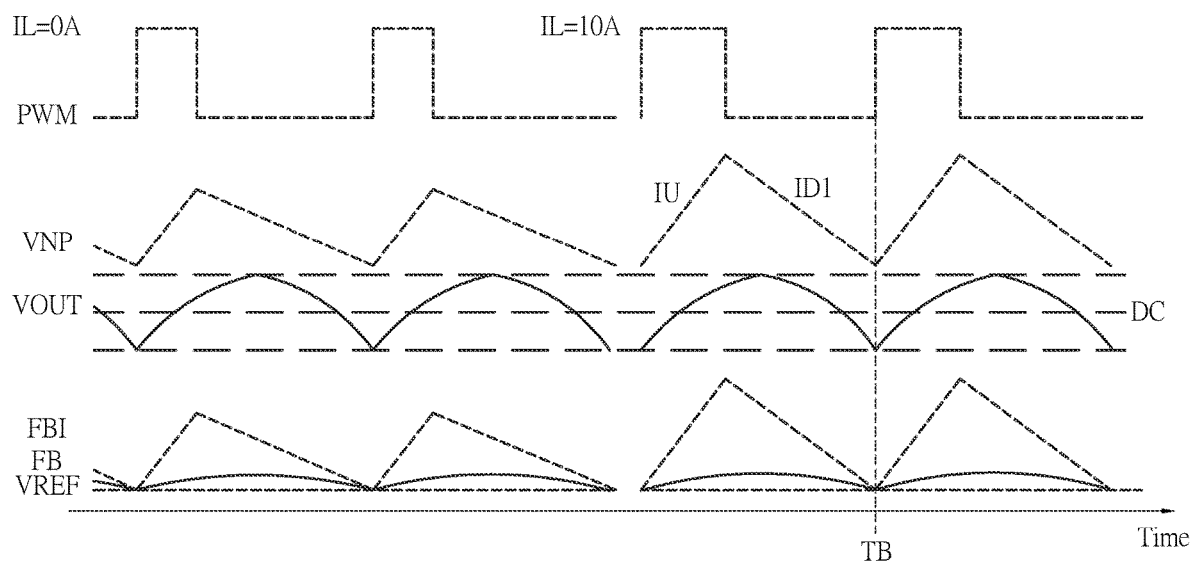
FIG. 7 is a waveform timing diagram of the control circuit of the power converter of the invention adjusting the slope of the falling part ID1 of the ripple signal VNP under heavy load (IL=10 A).

Please refer to FIG. 7. FIG. 7 is a waveform timing diagram of the control circuit of the power converter of the invention that adjusts the slope of the falling part of the ripple signal under heavy load.

It should be noted that the left half of FIG. 7 is a waveform timing diagram of each signal at light load (the sensing signal IL=0 A), and the right half of FIG. 7 is a waveform timing diagram of each signal at heavy load (the sensing signal IL=10 A).

When the current value of the sensing signal IL increases (for example, from 0 A to 10 A), the on-time of the PWM signal PWM increases due to the fixed frequency control, resulting in the increasing of the peak voltage reached by the rising part IU of the ripple signal VNP, and the peak voltage of the second feedback signal FBI obtained by adding the ripple signal VNP to the first feedback signal FB, also increases.

However, the difference between the invention and the prior art is that the slope of the falling part ID1 of the ripple signal VNP of the invention under heavy load will not remain the same as the slope under light load, but increases with the increasing of the load (that is, the current value of the sensing signal IL increases), so that the adjusted falling part ID1 can be reduced to the lowest voltage value at the time TB (that is, the PWM signal PWM changes from low level to high level). Therefore, no ripple offset VD will be generated, and the second feedback signal FBI will not decrease with the increase of the consuming, so as to achieve a stable output of the power converter.

Another embodiment according to the invention is a control method of a power converter. In this embodiment, the control method is used to control an output stage of the power converter to convert an input voltage into an output voltage and generate an output current.

Figure 8:
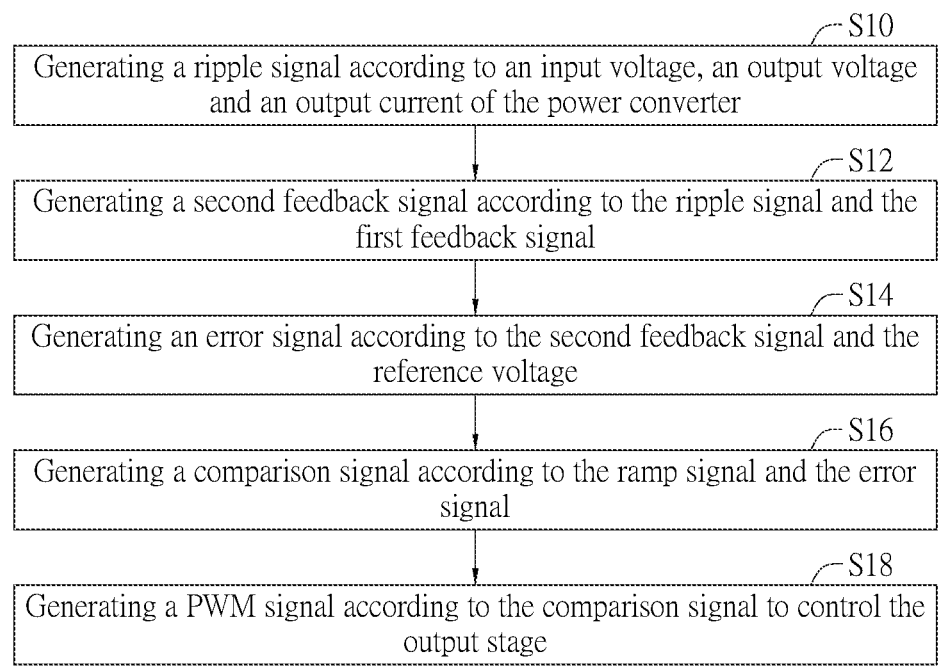
FIG. 8 is a flowchart of a control method of a power converter in another embodiment of the invention.

Please refer to FIG. 8. FIG. 8 is a flowchart of the control method of the power converter in this embodiment. As shown in FIG. 8, the control method includes the following steps of:

Step S10: generating a ripple signal according to an input voltage, an output voltage and an output current of the power converter;

Step S12: generating a second feedback signal according to the ripple signal and the first feedback signal, wherein the first feedback signal is related to the output voltage;

Step S14: generating an error signal according to the second feedback signal and the reference voltage;

Step S16: generating a comparison signal according to the ramp signal and the error signal; and Step S18: generating a PWM signal according to the comparison signal to control the output stage, and the slope of the ripple signal changes with the output current.

It should be noted that the ripple signal generated in the step S10 includes a rising part and a falling part, and a slope of the falling part changes with the output current. For example, when the output current is larger, the slope of the falling part is larger, and vice versa.

In an embodiment, the step S10 can generate the rising part according to the input voltage and the output voltage and generate the falling part according to the output voltage and the output current, but not limited to this.

In another embodiment, the control method further selectively outputs the rising part and the falling part as the ripple signal according to the PWM signal.

In another embodiment, the control method can also sense the output current from the output stage and provide a sensing signal, and generate a current signal according to the sensing signal to adjust the slope of the falling part. The adjusted falling part will be equal to the falling part before adjustment plus the current signal. The current signal is K times the sensing signal, and K is a magnification, but not limited to this.

In another embodiment, the above control method can also sense the output current from the output stage and provide a sensing signal, and generate a voltage signal according to the sensing signal and the output voltage to adjust the slope of the falling part. The voltage signal will be equal to the output voltage plus K times the sensing signal, and K is a magnification, but not limited to this.

Compared to the prior art, the control circuit and the control method of the power converter of the invention have the following advantages/effects:

(1) there is no need to dispose passive components of the ripple injection circuit externally, so the number of components can be effectively reduced;

(2) since a circuit with a large capacitance (such as an integrator/differential circuit, etc.) does not need to be disposed in the internal ripple injection circuit, the circuit area can be effectively reduced; and (3) when the load increases, the drop of the output voltage can be effectively reduced or even eliminated to achieve a stable output.

What is claimed is:

1. A control circuit of a power converter, the control circuit being coupled to an output stage and configured to control the output stage to convert an input voltage into an output voltage and generate an output current, and the control circuit comprising:
   a ripple generation circuit, configured to generate a ripple signal according to the input voltage, the output voltage and the output current;
   a synthesis circuit, coupled to the ripple generation circuit and configured to receive the ripple signal and a first feedback signal to provide a second feedback signal, wherein the first feedback signal is related to the output voltage;
   an error amplifier, configured to receive the second feedback signal and a reference voltage to generate an error signal;
   a comparator, configured to receive a ramp signal and the error signal to generate a comparison signal; and
   a pulse width modulation (PWM) circuit, coupled to the comparator and the output stage and configured to generate a PWM signal according to the comparison signal to control the output stage,
   wherein a slope of the ripple signal changes with the output current.

2. The control circuit of claim 1, wherein the ripple signal comprises a rising part and a falling part, and a slope of the falling part changes with the output current.

3. The control circuit of claim 2, wherein when the output current increases, the slope of the falling part increases.

4. The control circuit of claim 2, wherein the ripple generation circuit comprises:
   a first current source, configured to generate the rising part according to the input voltage and the output voltage; and
   a second current source, configured to generate the falling part according to the output voltage and the output current.

5. The control circuit of claim 4, wherein the ripple generation circuit comprises:
   a capacitor; and
   a switch, coupled to the first current source, the second current source and the capacitor respectively, configured to be controlled by the PWM signal to selectively switch the first current source to charge the capacitor or the second current source to discharge the capacitor.

6. The control circuit of claim 2, wherein the ripple generation circuit generates a current signal according to a sensing signal to adjust the slope of the falling part.

7. The control circuit of claim 6, further comprising:
   a sensing circuit, coupled to the output stage and the ripple generation circuit respectively and configured to sense the output current from the output stage and provide the sensing signal to the ripple generation circuit.

8. The control circuit of claim 6, wherein the adjusted falling part equals to the falling part before adjustment plus the current signal, and the current signal is K times the sensing signal and K is a magnification larger than 1.

9. The control circuit of claim 2, wherein the ripple generation circuit generates a voltage signal according to a sensing signal to adjust the slope of the falling part.

10. The control circuit of claim 9, wherein the voltage signal equals to the output voltage plus K times the sensing signal multiplied by a resistance value and K is a magnification larger than 1.

11. The control circuit of claim 9, wherein the output stage is coupled to a load and the sensing signal is a load current flowing through the load.

12. A control method of a power converter, the power converter being coupled to an output stage and controlling the output stage to convert an input voltage into an output voltage and generate an output current, the control method comprising steps of:
   (a) generating a ripple signal according to the input voltage, the output voltage and the output current;
   (b) receiving the ripple signal and a first feedback signal to provide a second feedback signal, wherein the first feedback signal is related to the output voltage;
   (c) generating an error signal according to the second feedback signal and a reference voltage;
   (d) generating a comparison signal according to a ramp signal and the error signal; and
   (e) generating a PWM signal according to the comparison signal to control the output stage,
   wherein a slope of the ripple signal changes with the output current.

13. The control method of claim 12, wherein the ripple signal comprises a rising part and a falling part, and a slope of the falling part changes with the output current.

14. The control method of claim 13, wherein when the output current increases, the slope of the falling part increases.

15. The control method of claim 13, wherein the step (a) further comprises:
   (a1) generating the rising part according to the input voltage and the output voltage; and
   (a2) generating the falling part according to the output voltage and the output current.

16. The control method of claim 13, wherein the step (a) further comprises:
   selectively outputting the rising part and the falling part as the ripple signal according to the PWM signal.

17. The control method of claim 13, wherein the adjusted falling part equals to the falling part before adjustment plus a current signal, and the current signal is K times a sensing signal of the output current and K is a magnification larger than 1.

18. The control method of claim 13, wherein the step (a) further comprises:
   sensing the output current and providing a sensing signal; and
   generating a voltage signal according to the sensing signal and the output voltage to adjust the slope of the falling part.

19. The control method of claim 18, wherein the voltage signal equals to the output voltage plus K times the sensing signal multiplied by a resistance value and K is a magnification larger than 1.

* * * * *